Sept. 3, 1935.    O. V. MECHLER ET AL    2,013,356
SHOCK ELIMINATOR
Filed Oct. 27, 1930    2 Sheets-Sheet 1
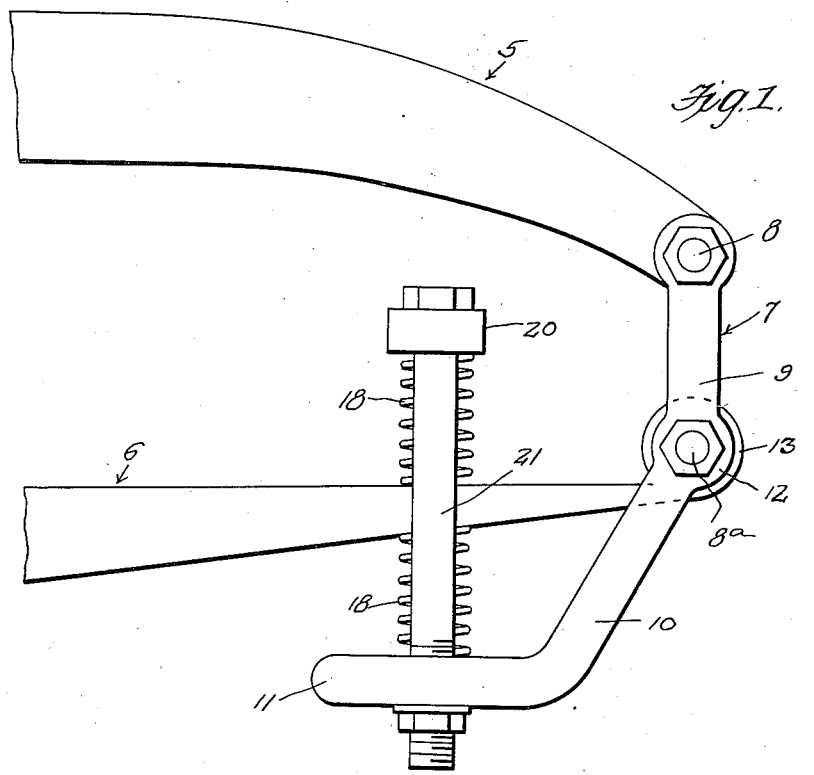
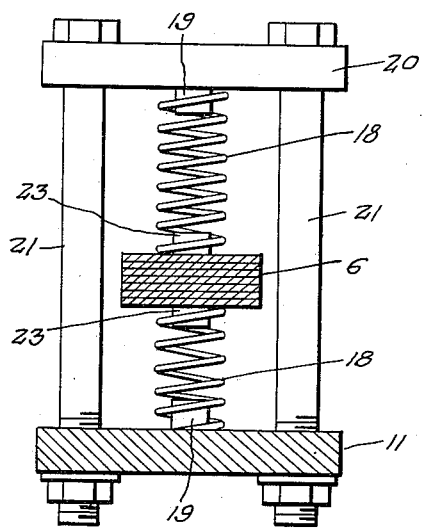
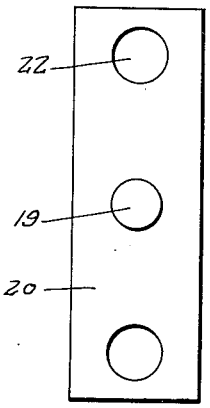
Inventors
Otto V. Mechler,
W. W. Toxey,
By Clarence A. O'Brien
Attorney Sept. 3, 1935.  O. V. MECHLER ET AL  2,013,356
SHOCK ELIMINATOR
Filed Oct. 27, 1930   2 Sheets-Sheet 2

Inventors
Otto V. Mechler,
W. W. Toxey,
By Clarence A. O'Brien
Attorney

Patented Sept. 3, 1935

2,013,356

UNITED STATES PATENT OFFICE 2,013,356

SHOCK ELIMINATOR

Otto V. Mechler and Walter W. Toxey,
San Antonio, Tex.

Application October 27, 1930, Serial No. 491,581

12 Claims. (Cl. 267—17)

This invention relates generally to shock eliminators for association with longitudinal and other vehicle springs, and particularly to a shock eliminator for use with the left front spring structure of a vehicle to eliminate the throw which is ordinarily communicated to the steering gear of the vehicle whenever the vehicle passes over an uneven road surface, but my novel shock eliminator may be employed with equal efficiency for eliminating other road shocks when applied to any of the springs of a vehicle.

It is an object of this invention to provide a shock eliminator of the type described which may be readily and quickly and inexpensively incorporated in a vehicle spring structure of conventional type, the device itself and its appurtenances being relatively inexpensive to manufacture.

It is also an object of this invention to provide a shock eliminator of this type which will practically entirely eliminate objectionable road shocks and prevent their communication to the steering gear and chassis of a vehicle during its passage over an uneven or imperfect surface.

The features of novelty and advantage which distinguish this invention, and the manner in which its high efficiency and satisfactory operation is accomplished, and the combination and arrangement of parts which compose the same, will be readily understood by any one acquainted with the art to which this invention relates upon consulting the following descriptions of the drawings, in which:—

Figure 1 is a side elevational view of a front spring horn and the front end portion of the left front spring of a vehicle, showing incorporated therewith an embodiment of our novel shock eliminator.

Figure 2 is a transverse vertical sectional view through the vehicle spring and a portion of the eliminator shown in Figure 1.

Figure 7 is a plan view of the underside of the removable cross member shown in Figure 1.

Figure 3:
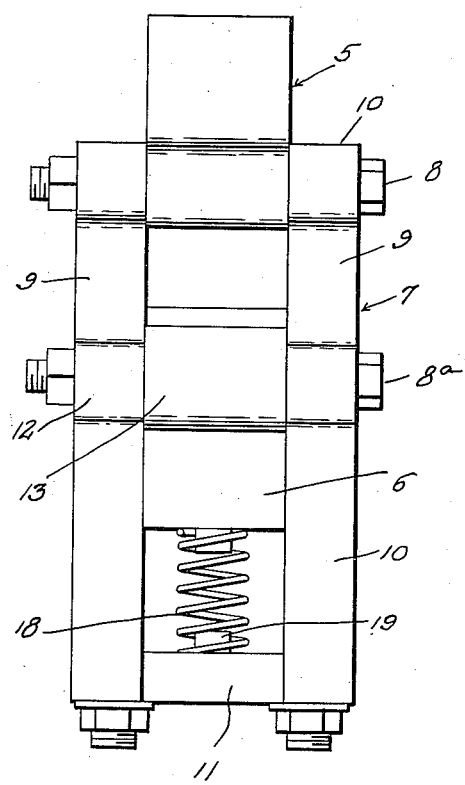
Figure 3 is an end elevational view taken from the right of Figure 1.
Figure 4:
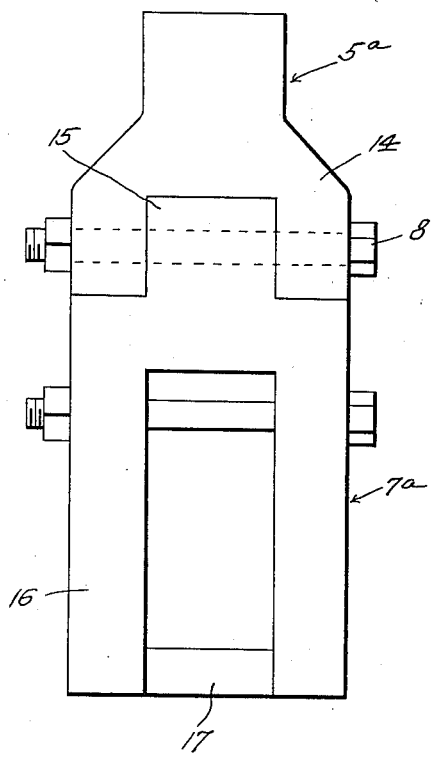
Figure 4 is a similar view to Figure 3 disclosing another embodiment of our invention in which a portion of the eliminator is embraced by the furcations of a divided spring horn.

Referring in detail to the drawings, the numeral 5 designates generally a conventional spring horn such as is used for mounting one end of a longitudinal spring generally designated 6. It is believed to be the common practice to mount the front end of the front spring in a divided horn 5a as shown in Figure 4, and our invention contemplates the use of this type of spring horn as well as the type which is undivided and constructed like a rear spring horn as disclosed in Figures 1 and 3. Shackle assemblies generally designated 7 and 7a are provided rockably connected to the end of the spring horn by a conventional shackle bolt 8. In the form of the invention shown in Figures 1 and 3 the shackle assembly comprises a pair of vertical side members 9 which are transversely bored at their upper ends to receive the upper shackle bolt 8, the side portions 9 being placed one on either side of the spring horn 5. The portions 9 are normally disposed in a substantially perpendicular position. Projecting from the lower ends of the portions 9 downwardly and inwardly at an angle are extensions 10 which have at their lower extremities substantially horizontal portions 11 which are connected together so as to form a web across the lower ends of the angular portions 10. The eye at one end of the spring 6 is mounted by means of a shackle bolt 8a passing through the lower ends of the side members 9 at the point where they are enlarged as indicated at 12 in Figure 3. The spring eye is generally designated 13.

In the embodiment of the invention disclosed in Figure 4, in which the divided spring horn 5a is used, having the furcations 14, traversed by the shackle bolt 8, a lug 15 is rockably mounted on the bolt 8 upper end of a U-shaped body comprising vertical normally perpendicular side arms 16 carries the lug 15 on its bight portion. The lower portions of the side arms 16 are downwardly and inwardly angularly directed. The lower ends of the lower portions are connected by a plate 17 which corresponds to the web 11 of the form of the invention shown in Figure 3.

Figure 5:
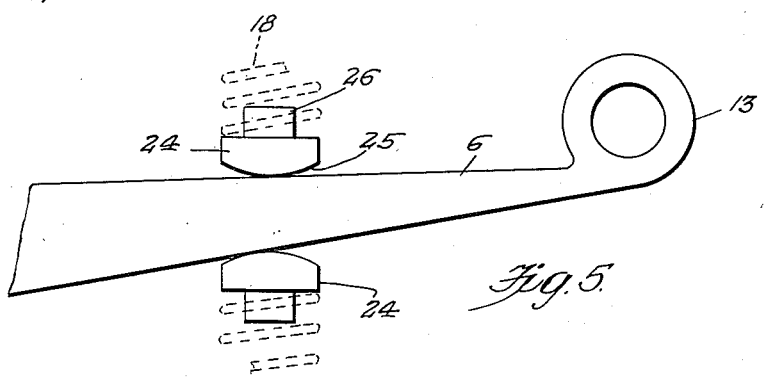
Figure 5 is a side elevational view of the front end portion of the spring showing an arrangement of spring engaging members which are required in a further embodiment of our invention.
Figure 6:
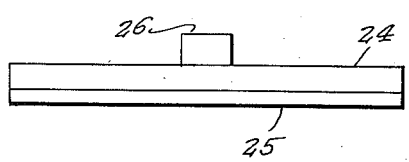
Figure 6 is a side elevational view of one of the spring engaging members shown in Figure 5.

The end portion of the spring 6 inwardly of the eye 13 is contacted by a pair of springs 18 of the helical type one of the springs 18 being arranged engaged with the upper surface and the other engaged with the lower surface of the spring and substantially perpendicular thereto at the longitudinal center of the spring. Preferably the ends of the vehicle springs 18 which act against the spring 6 are provided with rocker members 24, the form of which is disclosed in Figures 5 and 6. The bearing or rocker members 24 are in the form of elongated bodies arranged across the vehicle spring 6 and provided with rounded rocker surfaces 25 engaged directly with opposite sides of the spring 6. The opposite side of each body is provided with a lug 26 over which the end of the companion coil spring 18 is passed to maintain assembly of the coil spring, the bearing member, and the vehicle spring 6. If desired, the rocker members 24 may be dispensed with and coil spring end receiving lugs 19 constructed on the upper and lower sides of the vehicle spring 6 for properly positioning the coil springs, the members 24, and the vehicle spring, in which event the springs 18 directly contact the vehicle spring 6.

Extending at right angles from the web 11 in the case of the embodiment of the invention shown in Figure 1, and from the plate 17 in the case of the embodiment shown in Figure 4, is a bolt 21 at either side of the vehicle spring 6. The bolts 21 traverse the web 11 or plate 17, as the case may be, and have threaded thereon outside of and against the opposite side of the web 11 washers and nuts as shown. The web 11 has a boss 19 between the bolts 21 and receives thereon one of the coil springs 18 which is interposed between the web 11 and the underside of the vehicle spring 6. On the bolts 21 above the spring 6 is a cross bar 20 having a boss 19 on one side for receiving the coil spring 18 which is interposed between the upper surface of the spring 6 and the cross bar 20. The heads on the bolts 21 retain the cross bar 20 on the bolts as shown. It will be obvious that the compression of the springs 18 may be adjusted by turning the nuts on the bolts 21.

When a vehicle equipped according to our invention is moving upon a surface and encounters an obstacle or an uneven part of the surface, the spring 6 will be flattened so that it will become for an instant elongated. Elongation of the spring to an undue extent under such circumstances accounts for a major portion of the road shock being communicated to the steering gear at the left of the front end of a vehicle so that objectionable pick back and strain upon the steering mechanism obtains and is noticeable in the steering wheel. Such elongation of the left front spring of a vehicle is prevented by the device of the invention in the following manner when installed at the front end or rear end of the left front vehicle spring. As the obstacle is struck and the left front spring 6 thereby pushed upwardly and elongated, the front end of the vehicle spring 6 moves forwardly and swings the frame 7 forwardly. The forward movement of the frame 7 draws the spring frame attached to its lower end also downwardly so as to compress the upper coil spring 18 against the upper surface of the spring 6 in a manner to resist its upward flexing and as a consequence restrict and reduce its elongation. Upon the rebound of the spring 6, the frame 7 is swung oppositely, that is rearwardly, and the lower spring 18 is compressed against the lower surface of the spring 6 so as to limit the rebound flexing and consequently the rebound elongation of the spring 6. This action effects cancellation of the elongation of the vehicle spring 6 and thereby reduces or eliminates the shocks referred to, so that the vehicle steering gear is relieved of the objectionable throw mentioned above.

It is desired to expressly include within the province of this invention the incorporation of our shock eliminator in other than the front spring of a vehicle. The shackle assemblies described above may be equally well incorporated at the rear ends of the rear springs in which case they have a disposition identical to that described above in the case of incorporating our improved shock eliminator on the left front spring. It is believed equally obvious that by placing the eliminator at the rear ends of the front springs they will function as ordinary shock absorbers of superior characteristics, and that the eliminator is so designed as to be readily adapted to any automobile spring having a double shackle mounting.

It will now be understood that we have provided a device of the character described which when made and assembled according to the principles of this invention provides a new and novel and superior shock eliminator of the type described, which is admirably adapted for the purpose for which it was designed.

It is to be definitely understood that we do not desire to limit the application of this invention to the particular modifications set forth herein to illustrate the principles thereof, and any change or changes may be made in material and structure and arrangement of parts consistent with the spirit of the invention and the scope of the subjoined claims.

Having thus described the invention, what is claimed as new is:—

1. A shock eliminator of the type described for cancelling the lengthening of the left front spring of a vehicle and eliminating thereby the communication of road shocks to the steering gear, comprising a shackle assembly for mounting on the left front spring horn, a frame for disposal about the front end of the said spring, a pair of helical springs carried by said frame for directly contacting upper and lower sides of said spring, and a lever extension on said shackle assembly and connected to said frame for alternately compressing said helical springs upon the movement of the said spring, said frame consisting of a pair of transversely spaced bolts carried by a lower end portion of the shackle assembly one on each side of the spring, and a bar across the upper ends of the bolts, one of said springs being disposed between the bar and the upper side of the vehicle spring, and the other helical spring being disposed between the end portion of the shackle assembly and the other side of the vehicle spring, and nuts on the bolts for adjusting the action of the helical springs.

2. A shock eliminator for the front end of a front vehicle spring comprising a pair of arms rockably connecting the associated spring horn and the front end of the vehicle spring, a relatively short downward extension on each arm, a frame carried by and connecting the lower end portions of the said extensions, spring means mounted on the frame for acting in opposite directions against the upper and lower surfaces of the vehicle spring.

3. A shock eliminator for connection between the front end of a front vehicle spring and the front end of the associated front spring horn, comprising a pair of side members rockably connected at their upper ends to the spring horn and rockably connected at their lower ends to the front end of the vehicle spring and between which the front end of the spring is disposed, a downward extension on the lower end of each side member, a generally vertical frame supported on and rigidly connecting the lower end portions of the downward extensions, spring means carried by the frame for acting in opposite directions against the upper and lower surfaces of the front end portion of the vehicle spring.

4. A shock eliminator of the type described for cancelling the lengthening of the left front spring of a vehicle and eliminating thereby the communication of road shocks to the steering gear of the vehicle, said eliminator comprising a shackle assembly for mounting on the left front spring horn, a frame for disposal about the front end of the vehicle spring, a pair of helical springs carried by the frame for engaging opposite faces of the vehicle spring, a lever extension on the shackle assembly extending rearwardly below the spring horn and connected to the frame for alternately compressing the helical springs upon flexing of the vehicle spring, said frame comprising a pair of transversely spaced bars projecting from an end portion of the lever extension, one on each side of the vehicle spring, a cross member connecting the outer ends of the bars, one of said helical springs being interposed between the cross member and the adjacent face of the vehicle spring and the other helical spring being interposed between the opposite face of the vehicle spring and the said lever extension.

5. A shock eliminator of the type described for cancelling the lengthening of the left front spring of a vehicle and eliminating thereby the communication of road shocks to the steering gear of the vehicle, said eliminator comprising a shackle assembly for mounting on the left front spring horn, a frame for disposal about the front end of the vehicle spring, a pair of helical springs carried by the frame for engaging opposite faces of the vehicle spring, a lever extension on the shackle assembly extending rearwardly below the spring horn and connected to the frame for alternately compressing the helical springs upon flexing of the vehicle spring, said frame comprising a pair of transversely spaced bars projecting from an end portion of the lever extension, one on each side of the vehicle spring, a cross member connecting the outer ends of the bars, one of said helical springs being interposed between the cross member and the adjacent face of the vehicle spring and the other helical spring being interposed between the opposite face of the vehicle spring and the said lever extension, said spaced bars being movable relative to the said lever extension, and adjustable means on the bars and engaged with the lever extension for limiting the movement of the bars relative to the lever extension whereby the compression of the helical springs may be adjusted.

6. A shock absorber for mounting one end of a vehicle spring to a spring horn, said shock absorber comprising a pair of arms rockably connected to the spring horn and to one end of the vehicle spring, an inward extension on each arm disposed along one face only of the vehicle spring, a frame carried by and connecting the inner end portions of the extensions and extending vertically thereof at opposite sides of the vehicle spring, spring means carried by the frame for acting in opposite directions against opposite faces of the vehicle spring.

7. A vehicle spring shackle comprising an arm rockably connected at one end to one end of the vehicle spring and at its other end to the vehicle, a second arm fixed to the first arm and extending inwardly of the arm and of said end of the vehicle spring and having a portion extending along and spaced from one face of the spring only, a frame carried by the portion and extending on opposite sides of the vehicle spring, and springs carried by the frame and engaging opposite faces of the vehicle spring.

8. A vehicle spring shackle comprising a normally vertical arm pivoted at one end to one end of the vehicle spring and at its other end to the vehicle, a second arm fixed to the first arm and extending inwardly of the arm and of said end of the vehicle spring and having a normally horizontal portion lying along and spaced from one face only of the vehicle spring, a frame fixed to the said horizontal portion and extending on opposite sides of the vehicle spring, and compression springs carried by the frame and engaging opposite faces of the vehicle spring.

9. A vehicle spring shackle comprising an arm having a normally vertical portion having one end pivoted to one end of the vehicle spring and the opposite end pivoted to the vehicle, a second portion on the first arm extending inwardly of the vertical portion and of said end of the vehicle spring and spaced from one face thereof, a normally vertical frame fixed to the second portion and extending on opposite sides of the vehicle spring and substantially parallel to the vertical portion, and compression springs carried by the frame and engaging opposite faces of the vehicle spring.

10. A vehicle spring shackle comprising an arm having a vertical portion having its upper end pivoted to the vehicle and its lower end pivoted to one end of the vehicle spring, a second portion on the arm extending inwardly of the said end of the vehicle spring and having a third horizontal portion arranged at right angles to the first vertical portion and extending along and substantially parallelly spaced from one face only of the vehicle spring, a vertical frame carried by the said third portion and extending at opposite sides of the vehicle spring, said frame being arranged at right angles to the said third portion and parallel to the said vertical portion, and compression springs carried by the frame and engaging opposite faces of the vehicle spring.

11. A shackle assembly for connecting one end of a vehicle spring of the semi-elliptical type to a shackle support, said shackle assembly comprising a vertical arm pivotally connected at its upper end to the shackle support and pivotally connected at its lower end to the end of the vehicle spring, the pivotal points being substantially perpendicularly aligned, an extension on the arm projecting inwardly from the arm and from the said end of the vehicle spring along one face only of the vehicle spring, a frame carried by the extension and having portions located at opposite sides of the vehicle spring, and spring means carried by the frame and engaged with opposite faces of the vehicle spring.

12. A shackle assembly for connecting one end of a vehicle spring of the semi-elliptical type to a shackle support, said shackle assembly comprising a member, a pair of vertically spaced and substantially perpendicularly aligned pivots carried by the member, the upper pivot rockably connecting the member to the shackle support and the lower pivot rockably connecting the said end of the vehicle spring to the member, an arm on and projecting inwardly from the member and from the said end of the vehicle spring and having a position extending along one face only of the vehicle spring, and spring means carried by the arm and engaging opposite faces of the vehicle spring.

OTTO V. MECHLER.
WALTER W. TOXEY.